US010853213B2

(12) United States Patent
Ganesan et al.

(10) Patent No.: US 10,853,213 B2
(45) Date of Patent: Dec. 1, 2020

(54) VALIDATION OF INSTALLATION OF REMOVEABLE COMPUTER HARDWARE COMPONENTS

(71) Applicant: Dell Products, L.P., Round Rock, TX (US)

(72) Inventors: Vaideeswaran Ganesan, Bangalore (IN); Suren Kumar, Tamil Nadu (IN)

(73) Assignee: Dell Products, L.P., Round Rock, TX (US)

( * ) Notice: Subject to any disclaimer, the term of this patent is extended or adjusted under 35 U.S.C. 154(b) by 148 days.

(21) Appl. No.: 16/015,687

(22) Filed: Jun. 22, 2018

(65) Prior Publication Data

US 2019/0392148 A1 Dec. 26, 2019

(51) Int. Cl.
*G06F 11/22* (2006.01)
*G06F 9/4401* (2018.01)
(Continued)

(52) U.S. Cl.
CPC ........ *G06F 11/2221* (2013.01); *G06F 9/4401* (2013.01); *G06F 11/3055* (2013.01); *G06F 11/321* (2013.01)

(58) Field of Classification Search
CPC .. G06F 9/4401; G06F 9/4411; G06F 11/2221; G06F 11/2247; G06F 11/3041;
(Continued)

(56) References Cited

U.S. PATENT DOCUMENTS 5,579,509 A * 11/1996 Furtney ............... G06F 8/71
703/27
6,216,186 B1 * 4/2001 Mayhead ........... G06F 11/006
710/301
(Continued)

FOREIGN PATENT DOCUMENTS

JP 2015069211 A * 4/2015

OTHER PUBLICATIONS

Mattern, RC. "Loose Connector Detection". IBM Technical Disclosure Bulletin. Jun. 1972. IBM Incorporated. (Year: 1972).*
(Continued)

*Primary Examiner* — Thomas J. Cleary
(74) *Attorney, Agent, or Firm* — Fogarty LLP

(57) ABSTRACT

Installation errors for removable hardware components are typically identified only after placing an IHS (Information Handling System) back into service. Upon servicing a removeable hardware component and powering the IHS, a hardware validation request may be issued during booting of the IHS. In certain instances, a technician may trigger a hardware validation request via keyboard inputs during booting. If a hardware validation request is detected, the IHS is diverted from booting to a hardware validation process that identifies the removeable hardware components coupled to the hardware connectors supporting removeable hardware and determines a support level for the removeable hardware components at their installed connector locations. If performance issues are indicated by the support level for the
(Continued)

hardware component, a hardware installation recommendation is displayed. The technician may resume booting or perform additional service on the IHS based on the recommendation.

20 Claims, 3 Drawing Sheets

(51) Int. Cl.
  *G06F 11/30* (2006.01)
  *G06F 11/32* (2006.01)
(58) Field of Classification Search
  CPC .. G06F 11/3048; G06F 11/3051; G06F 11/32; G06F 11/321; G06F 11/324; G06F 11/327; G06F 11/328; G06F 11/3466; G06F 11/3485; G06F 11/349; G06F 13/4063; G06F 13/4068; G06F 21/57; G06F 9/4403; G06F 11/3055
  See application file for complete search history.

(56) References Cited

U.S. PATENT DOCUMENTS

| | | | | |
|---|---|---|---|---|
| 6,889,059 B1* | 5/2005 | Fragola | ............... | G06K 7/0034 |
| | | | | 379/114.17 |
| 6,898,768 B1* | 5/2005 | Theodossy | ............... | G06F 8/65 |
| | | | | 703/27 |
| 7,240,222 B1* | 7/2007 | Falik | ............... | G06F 1/3209 |
| | | | | 713/300 |
| 9,092,302 B2* | 7/2015 | Oberheide | .......... | G06F 16/2455 |
| 9,627,789 B2* | 4/2017 | Dharmadhikari | ...... | H01R 13/00 |
| 2002/0021671 A1* | 2/2002 | Quinlan | ............. | H04L 43/0811 |
| | | | | 370/242 |
| 2003/0009253 A1* | 1/2003 | McIntyre | ........... | G05B 23/0216 |
| | | | | 700/108 |
| 2004/0199899 A1* | 10/2004 | Powers | ................... | G06F 8/71 |
| | | | | 717/120 |
| 2004/0260857 A1* | 12/2004 | Henderson | ........... | G06F 11/008 |
| | | | | 710/313 |
| 2005/0005269 A1* | 1/2005 | Zilavy | ...................... | G06F 8/71 |
| | | | | 717/170 |
| 2006/0136754 A1* | 6/2006 | Liu | ....................... | G06F 1/3209 |
| | | | | 713/300 |
| 2008/0244142 A1* | 10/2008 | Tu | ....................... | G06F 13/4081 |
| | | | | 710/301 |
| 2011/0040916 A1* | 2/2011 | Atherton | ............. | G06F 13/4295 |
| | | | | 710/300 |
| 2012/0159136 A1* | 6/2012 | Rothman | .............. | G06F 9/4401 |
| | | | | 713/2 |
| 2012/0221166 A1* | 8/2012 | Fukuda | ............. | H05K 7/20209 |
| | | | | 700/300 |
| 2014/0055233 A1* | 2/2014 | Vetrivel | ................. | G07C 11/00 |
| | | | | 340/5.8 |
| 2015/0143360 A1* | 5/2015 | Kline | ..................... | G06F 9/445 |
| | | | | 717/176 |
| 2015/0186171 A1* | 7/2015 | Kotta, Sr. | ........... | G06F 9/45533 |
| | | | | 718/1 |
| 2018/0011714 A1* | 1/2018 | Han | ..................... | G06F 3/0604 |
| 2018/0314318 A1* | 11/2018 | Remis | ..................... | G06F 1/26 |
| 2018/0351790 A1* | 12/2018 | Khemani | .............. | G06F 3/0604 |
| 2020/0004656 A1* | 1/2020 | Ma | ........................ | G06F 11/349 |

OTHER PUBLICATIONS

"Intel Management Module Technical Product Specification". Revision 1.1. Oct. 2006. Intel Corporation. (Year: 2006).*

"Card insertion/removal notification device". JP2015069211A. Google Patents. Retrieved from Internet Apr. 27, 2020. <https://patents.google.conn/patent/JP2015069211A/en?oq=jp2015069211>. (Year: 2020).*

* cited by examiner

VALIDATION OF INSTALLATION OF REMOVEABLE COMPUTER HARDWARE COMPONENTS

FIELD

This disclosure relates generally to the configuration of an Information Handling System (IHS), and more specifically, to the installation of removeable IHS hardware components.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS typically includes a printed circuit board—that may also be referred to as a motherboard or a baseboard—that includes various different types connectors by which hardware components may be coupled to the IHS. The form factor of each connector may conform to a particular standard or protocol for interfacing with hardware components coupled to the connectors. Certain connectors may serve as expansion slots that allow hardware components to be electrically and mechanically coupled to the IHS in order to provide the IHS with additional capabilities and/or resources. For instance, a PCIe (Peripheral Component Interconnect Express) network card may be coupled to an IHS via a PCIe connector provided on the motherboard of the IHS. In another example, a motherboard may include DIMM (Dual In-line Memory Module) connectors by which high-speed system memory modules may be coupled to the IHS.

An IHS may occasionally require reconfiguration of removable hardware components. In certain instances, an IHS may be upgraded with removable hardware components that provide improved performance and/or additional capabilities. In other instances, removable hardware components that have been identified as faulty may be replaced. In other instances, an IHS may be repurposed such that some or all of the removable hardware components may be removed and replaced with different components. Correctly administering such hardware modifications requires identifying the correct hardware component to be removed, replacing the removed component with the correct replacement component, and correctly installing the replacement component in the expansion slot of the IHS.

In an enterprise computing environment, administrators may be tasked with supporting a large number of IHSs. Modern IHSs may support a wide variety of different hardware configurations in which different removable hardware components may be supported at each of the different connectors provided by IHS. Accordingly, administrators of enterprise computing systems must support a large number of different hardware configurations. In such environments, removable hardware components may be unintentionally installed in an incorrect slot that does not support the removable hardware component, or only provides limited support for the removable hardware component. Such installation errors may be difficult to diagnose and may result in increased component failures. Currently, such installation errors are typically identified only after placing the IHS back into service.

SUMMARY

In various embodiments, a method for validating the installation of hardware components installed in an IHS includes: detecting a hardware validation request during booting of the IHS; diverting booting of the IHS to a hardware validation process configured to: determine a plurality of removeable hardware components installed in the IHS, wherein each of the removeable hardware components is coupled to one or more connectors supported by the IHS; determine, based on the one or more connectors to which each removeable hardware component is coupled, a support level for each of the plurality of removeable hardware components; identify, based on the support levels for each of the plurality of removeable hardware components at the one or more connectors, one or more of the removeable hardware components with performance issues; and display a hardware installation recommendation for one or more of the removeable hardware components with performance issues.

In certain additional method embodiments, the hardware validation request is signaled by the depression of a designated push-button component of the IHS. In certain additional method embodiments, the push-button is a designated key of a keyboard coupled to the IHS. In certain additional method embodiments, the booting of the IHS operating system is suspended during the operation of the hardware validation process. In certain additional embodiments, the method further includes: determining, based on the support levels, performance characteristics for a first removeable hardware component coupled to a first plurality of connectors of the connectors supported by the IHS; and identifying an improvement to the performance characteristics for the first removeable hardware component, if the first removeable hardware component is decoupled from the first plurality of connectors and coupled to a second plurality of connectors of the connectors supported by the IHS. In certain additional method embodiments, the hardware installation recommendation specifies moving the first removeable hardware component from the first plurality of connectors to the second plurality of connectors. In certain additional method embodiments, the hardware installation recommendation specifies an available firmware upgrade for one or more of the removeable hardware components with performance issues. In certain additional method embodiments, the hardware installation recommendation specifies a second removeable hardware component that must be installed in the IHS to utilize the first removeable hardware component while coupled to the first plurality of connectors.

In various embodiments, an IHS (Information Handling System) includes: one or more hardware connectors; a plurality of removeable hardware components, each coupled to one or more of the hardware connectors; and a memory device coupled to the one or more processors, the memory device storing computer-readable instructions that, upon execution by one or more processors, cause the system to: detect a hardware validation request during booting of the IHS; divert booting of the IHS to a hardware validation process configured to: identify the plurality of removeable hardware components coupled to hardware connectors; determine, based on the one or more connectors to which each removeable hardware component is coupled, a support level for each of the plurality of removeable hardware components; identify, based on the support levels for the removeable hardware components at the respective one or more connectors, one or more of the removeable hardware components with performance issues; and display a hardware installation recommendation for one or more of the removeable hardware components with performance issues.

In certain additional IHS embodiments, the hardware validation request is signaled by the depression of a designated push-button component of the IHS. In certain additional IHS embodiments, the push-button is a designated key of a keyboard coupled to the IHS. In certain additional IHS embodiments, the booting of the IHS operating system is suspended during the operation of the hardware validation process. In certain additional IHS embodiments, the execution of the computer-readable instructions further causes the system to: determine, based on the support levels, performance characteristics for a first removeable hardware component coupled to a first plurality of connectors of the connectors supported by the IHS; and identify an improvement to the performance characteristics for the first removeable hardware component, if the first removeable hardware component is decoupled from the first plurality of connectors and coupled to a second plurality of connectors of the connectors supported by the IHS. In certain additional IHS embodiments, the hardware installation recommendation specifies moving the first removeable hardware component from the first plurality of connectors to the second plurality of connectors. In certain additional IHS embodiments, the hardware installation recommendation specifies an available firmware upgrade for one or more of the removeable hardware components with performance issues. In certain additional IHS embodiments, the hardware installation recommendation specifies a second removeable hardware component that must be installed in the IHS to utilize the first removeable hardware component while coupled to the first plurality of connectors.

In various embodiments, a computer-readable storage device having program instructions stored thereon for validating the installation of hardware components installed in an IHS (Information Handling System), upon execution by one or more processors, the program instructions cause the one or more processors to: detect a hardware validation request during booting of the IHS; divert booting of the IHS to a hardware validation process configured to: determine a plurality of removeable hardware components installed in the IHS, wherein each of the removeable hardware components is coupled to one or more connectors supported by the IHS; determine, based on the one or more connectors to which each removeable hardware component is coupled, a support level for each of the plurality of removeable hardware components; identify, based on the support levels for each of the plurality of removeable hardware components at the one or more connectors, one or more of the removeable hardware components with performance issues; and display a hardware installation recommendation for one or more of the removeable hardware components with performance issues.

In certain additional computer-readable storage device embodiments, the hardware validation request is signaled by the depression a designated key of a keyboard coupled to the IHS. In certain additional computer-readable storage device embodiments, the booting of the IHS operating system is suspended during the operation of the hardware validation process. In certain additional computer-readable storage device embodiments, the program instructions further causing the one or more processors to: determine, based on the support levels, performance characteristics for a first removeable hardware component coupled to a first plurality of connectors of the connectors supported by the IHS; and identify an improvement to the performance characteristics for the first removeable hardware component, if the first removeable hardware component is decoupled from the first plurality of connectors and coupled to a second plurality of connectors of the connectors supported by the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
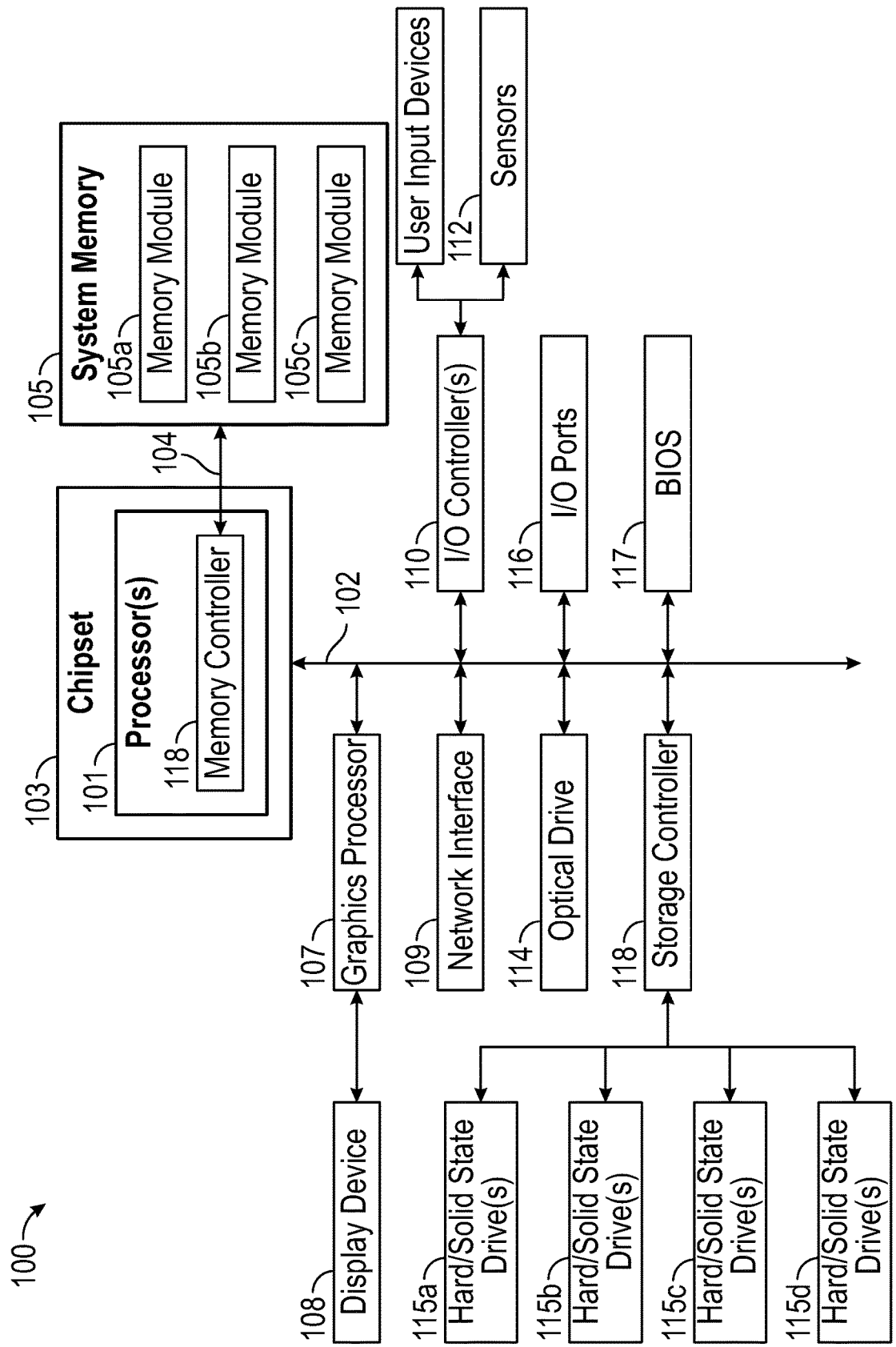
FIG. 1 is a block diagram depicting certain components of an IHS including removeable hardware components according to various embodiments.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of an enterprise server computer comprised within an enterprise system of similar enterprise servers, other embodiments may be utilized.

FIG. 1 is a block diagram of an IHS 100 configured according to certain embodiments to utilize various types of removable hardware components and further configured to utilize the techniques described herein for validating the installation of removable hardware components. In various embodiments, IHS 100 may execute program instructions that cause IHS 100 to perform certain of the operations disclosed herein. While a single IHS 100 is illustrated in FIG. 1, IHS 100 may be a component of an enterprise system that may include any number of additional IHSs that may also be configured to validate the installation of removable hardware components in the same or similar manner to IHS 100.

IHS 100 includes one or more processors 101, such as a Central Processing Unit (CPU), to execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 via the memory bus 104 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory.

In certain embodiments, the system memory 105 may be comprised of multiple removable memory modules. The system memory 105 of the illustrated embodiment includes three removable memory modules 105a, 105b and 105c. Each of the removable memory modules 105a-c may correspond to a motherboard memory socket that receives a removable memory module 105a-c, such as a DIMM (Dual In-line Memory Module), that can be coupled to the socket and then decoupled from the socket as needed, such as to upgrade memory capabilities or to replace faulty components. Other embodiments of IHS 100 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, the network interface 109 may be coupled to the chipset 103 via a PCIe bus. In such embodiments, the network interface 109 may be installed in a PCIe expansion slot provided via the motherboard of IHS 100.

Chipset 103 may also provide access to one or more display device(s) 108 via graphics processor 107. In certain embodiments, graphics processor 107 may be comprised within one or more video or graphics cards or an embedded controller installed as components of the IHS 100. Graphics processor 107 may generate display information and provide the generated information to one or more display device(s) 108 coupled to the IHS 100. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. The user input devices may interface with the I/O controller 110 through wired or wireless connections. Sensors 112 accessed via I/O controllers 110 may provide access to data describing environmental and operating conditions of IHS 100. Other components of IHS 100 may include one or more I/O ports 116 for communicating with peripheral external devices as well as various input and output devices. For instance, I/O 116 ports may include USB (Universal Serial Bus) ports, by which a variety of external devices may be coupled to IHS 100. In certain embodiments, the chipset 103 may also provide access to one or more optical drives 114 or other removable-media drives.

As illustrated, IHS 100 also includes a BIOS (Basic Input/Output System) 117 that may be stored in a non-volatile memory accessible by chipset 103 via bus 102. The BIOS 117 provides an abstraction layer that allows the operating system to interface with the hardware components of the IHS 100. Upon powering or restarting IHS 100, processor(s) 101 may utilize BIOS 117 instructions to initialize and test hardware components coupled to the IHS 100, including both components permanently installed as components of the motherboard of IHS 100 and removable components installed within the various expansion slots supported by the IHS 100. The BIOS 117 instructions may also load an operating system for use by the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the BIOS may be replaced, in full or in part, by a baseboard management controller (BMC) or another in-band or out-of-band controller that supports remote administration of IHS 100. In certain embodiments, aspects the techniques described herein for validating the installation of removable hardware components may be implemented by a BMC.

In the illustrated embodiment, IHS 100 includes four storage drives 115a-d. In various embodiments, the four storage drives 115a-d may include SAS (Serial Attached SCSI) magnetic disk drives, SATA (Serial Advanced Technology Attachment) magnetic disk drives, solid-state drives (SSDs) and other types of storage drives in various combinations. Each of the storage drives 115a-d may be located within the enclosure of the IHS 100, or alternatively one or more of the storage drives 115a-d may instead be external to IHS 100. One or more of the storage drives 115a-d may instead be located remotely from IHS 100 and may be configured as network attached storage devices. Using these four storage drives 115a-d, IHS 100 may be configured as a server that provides various services as a part of a cloud implementation of multiple servers that may be distributed across multiple physical locations. In certain embodiments, the four storage drives 115a-d may be components of a RAID (Redundant Array of Independent Disks) system.

In providing storage services, IHS 100 may utilize a storage controller 118 that provides access to the four storage drives 115a-d. In certain embodiments, the storage controller 118 may be a RAID controller that is configured to provide access to storage drives 115a-d as components of a RAID system. In various embodiments, storage controller 118 may be comprised of hardware and software that is configured to provide storage and retrieval of data from the storage drives 115a-d. Storage controller 118 may be configured to provide access to the four storage drives 115a-d as a single logical storage device as part of a distributed data storage solution. Certain embodiments may utilize additional storage controllers that provide access to additional storage devices.

In order to interact with other components of the distributed storage system, such as a RAID system, storage controller 118 may be accessed via the chipset 102 using a PCIe bus 119 utilizing PCIe communication capabilities integrated within the storage controller 118. In certain embodiments, storage controller 118 may be a removeable device that may be coupled and decoupled from a PCIe connector provided by IHS 100. In various embodiments, IHS 100 is configured to utilize PICe for transmitting communications with various additional removeable PCIe components in addition to storage controller 118. Using PCIe links, IHS 100 may be connected to other removeable PCIe compliant devices which provide IHS 100 with additional functionality. For instance, one or more of the bus interfaces for graphics processor 107, network controller 109, optical drive 114 may also utilize PCIe links of various bandwidths. In certain embodiments, IHS 100 may also utilize a PCIe bus for interfacing directly with neighboring IHSs in the formation of clusters of IHSs.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
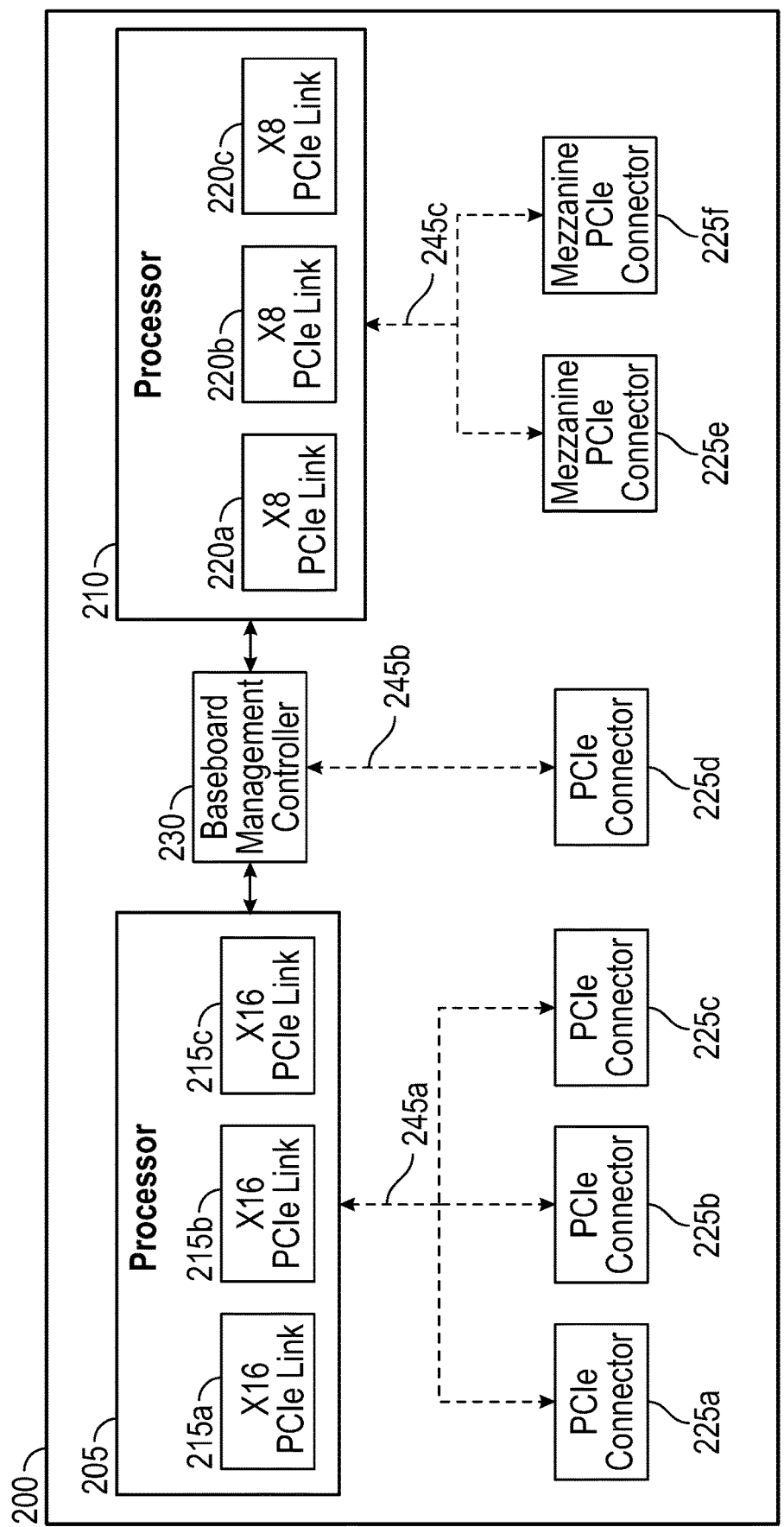
FIG. 2 is a diagram depicting certain internal removeable hardware components of an IHS configured for allocating PCIe bandwidth.

FIG. 2 depicts certain internal hardware components of an IHS 200 configured for allocating PCIe bandwidth among removable PCIe devices that may be coupled to PCIe connectors 225a-f supported by the IHS. In IHS 200 of FIG. 2, available PCIe bandwidth may be allocated by coupling removable PCIe devices to PCIe connectors 225a-f provided via the motherboard of IHS 200. IHS 200 includes two general-purpose processors 205 and 210 and a service processor 230, such as the BMC described with regard to FIG. 1.

As illustrated in FIG. 2, processor 205 includes three PCIe ports 215a-c that may be used to couple PCIe devices to IHS 200. In the illustrated scenario, processor 205 supports PCIe connections between the three PCIe ports 215a-c and removable PCIe devices coupled via general-purpose PCIe connectors 225a-c. Via these PCIe connectors 225a-c supported by processor 205, various removable PCIe components may be coupled to each of the x16 lane PCIe ports 215a-c supported by the processor 205. However, as illustrated, processor 205 does not support connectivity to PCIe connectors 225e-f that are also supported by IHS 200. Unlike the general-purpose PCIe connectors 225a-d, PCIe connectors 225e-f may be mezzanine connectors that are configured for supporting PCIe connections to removeable PCIe components in the form of low-profile cards or printed circuit boards that may be stacked in particular configurations. In such scenarios, the general-purpose PCIe connectors 225a-d may be visually similar to the mezzanine PCIe connectors 225e-f, thus increasing the likelihood a removeable PCIe component may be inadvertently coupled to the wrong connector.

As described, administration of an IHS may require installing removable hardware components in the IHS. For instance, administration of IHS 200 may require installing a PCIe RAID controller in one of the available PCIe connectors of the IHS 200. However, as illustrated in FIG. 2, PCIe mezzanine connectors 225e-f are not accessible by processor 205. Accordingly, an administrator of IHS 200 may inadvertently couple a PCIe RAID controller to PCIe mezzanine connectors 225e-f such that the installed PCIe RAID controller may be securely attached to the mezzanine connectors, but the PCIe RAID controller is nonetheless inaccessible to processor 205. In such scenarios, the PCIe RAID controller inadvertently connected to the PCIe mezzanine connectors 225e-f may be recognized by IHS 200 as an installed device, but may provide limited or no functionality without direct access to processor 205.

In another scenario, an administrator may intend to upgrade functionality of the BMC 230 via installation of a removeable PCIe device in PCIe connector 225d. As indicated in FIG. 2, connector 225d is the only PCIe slot that is directly accessible by the BMC 230. Accordingly, inadvertent installation of PCIe device in one of the other PCIe connectors 225a-c, e-f may result in the BMC 230 being able to support only limited interoperation with the incorrectly installed PCIe device via connections provided by processors 205, 210. If the PCIe device is instead correctly coupled to connector 225d, full interoperation with BMC 230 may be supported.

The PCIe connectors 225e-f supported by an IHS 200 may utilize one or more PCIe buses 245a-c supported by the IHS 200. A PCIe bus connection may be logically organized into data pathways that may be referred to as lanes, where each lane consists of two differential pairs of signaling wires. One of the differential pairs of each lane is used for transmission of PCIe data and the other differential pair is used for receiving PCIe data. In server applications, common PCIe connections include eight lane (x8), sixteen lane (x16) and thirty-two lane (x32) connections. Various other bandwidth PCIe connections may be supported by grouping the available lanes into links that may be utilize to support dedicated, hi-speed bus connections. For instance, within an x32 PCIe bus, the lanes may be grouped into four x8 bandwidth PCIe links, two x16 bandwidth PCIe links, or into combinations of links of various other bandwidths.

In FIG. 2, processor 205 is configured to support three x16 PCIe links 215a-c that connect to PCIe connectors 225a-c. Processor 210 is configured to support three x8 PCI links 220a-c that connect to PCIe connectors 225e-f. In certain scenarios, a removeable PCIe device that supports operation via a x16 PCIe link may be inadvertently coupled to processor 210 via one of the x8 PCIe links supported by PCIe connectors 225e-f. By incorrectly installing the removeable PCIe device in a lower-bandwidth PCIe connector, the full capabilities of the PCIe device may not be realized. Conversely, installing a PCIe device designed for use with an x8 PCIe link in one of the x16 PCIe connectors 225a-c may result in wasted PCIe bandwidth.

Figure 3:
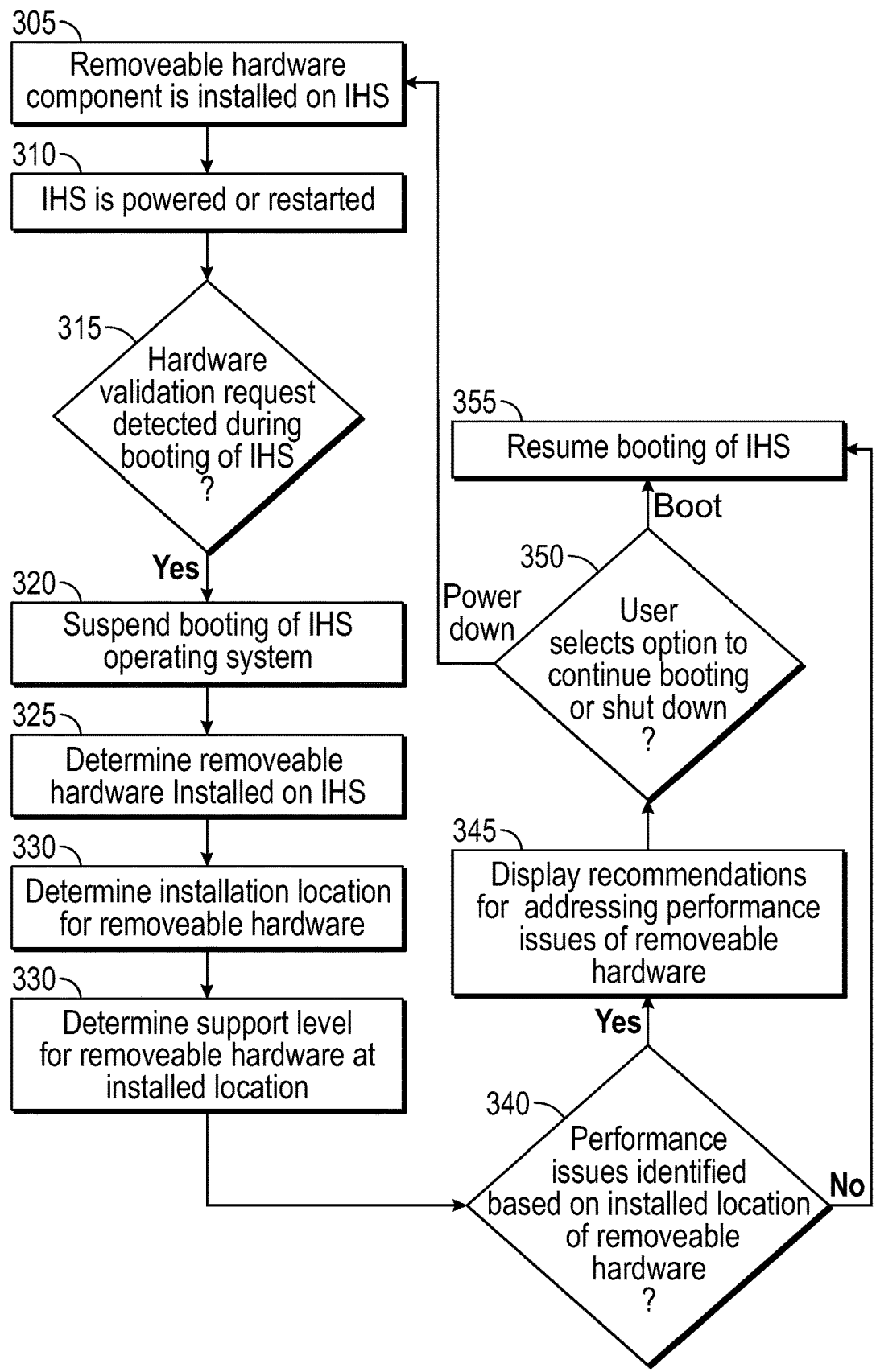
FIG. 3 is a flow chart illustrating certain steps of a process according to certain embodiments for validating the installation of removeable hardware components in an IHS.

FIG. 3 illustrates certain steps of a process according to various embodiments for validating the installation of removeable hardware components in an IHS. As described above, an IHS may be reconfigured by an administrator through the installation of removable hardware components, which may include the removal and replacement of previously installed removable hardware components. At step 305, one or more removable hardware components may be installed in IHS by an administrator. In certain scenarios, the removable hardware may be installed in an empty motherboard slot supported by the IHS. In other scenarios, the administrator may remove an existing removable hardware component from a motherboard slot of the IHS and a different removable hardware component may then be installed in its place. In other scenarios, the administrator may move an existing removable hardware component from one motherboard slot of the IHS to a different motherboard slot supported by the IHS. In many scenarios, the administrator may install the removable component by taking the IHS out of service and opening the enclosure of the IHS in order to access the motherboard.

With the removable hardware components installed, the administrator may power on the IHS at step 310. Importantly, the IHS need not be re-deployed to its normal operating state in order to validate the installation of the removeable hardware components. For instance, if the IHS is a blade server that is a component of a rack system, the administrator does not need to reinstall in the blade server in the rack and may not need to re-establish all of the cabling connections required for normal operation of the blade server. Instead, the validation of the installation of the removeable hardware components may be conducted while the IHS remains in the repair state selected by the administrator. For instance, an administrator may choose to remove an IHS from its installed location and transport the IHS to a workbench and open the enclosure of the IHS in order to couple a new removeable hardware component to one of the connectors supported by the IHS. In such a scenario, the administrator may utilize the described hardware validation process while the IHS is still at the workbench and without having to transport and redeploy the IHS to its installed location in order to determine whether the removeable hardware has been correctly installed.

At step 315, the IHS commences normal booting procedures. The IHS may be configured to monitor for a specified hardware validation signal that is generated in response to a user input during the booting procedures of the IHS. In certain embodiments, the IHS may be configured to monitor for a specific keyboard entry during the booting process. For instance, the display provided to the administrator during the booting procedure may specify a keyboard entry, such as depressing a specific function key, that will interrupt the boot process and initiate the hardware validation process described herein. In certain embodiments, the IHS may be configured with a designated pushbutton, such as a designated button provided via the enclosure and/or chassis of the IHS, that may be similarly used to signal a request for hardware validation during booting of the IHS. In certain embodiments, a BMC, such as baseboard management controller 230 of FIG. 2, may be programmed to monitor for such hardware validation signals during booting of the IHS.

If a request for validation of removable hardware is detected during booting of the IHS, at step 320 the booting of the operating system of the IHS is suspended. At this point, the IHS is diverted to a hardware validation mode during which the removable hardware installed in the IHS is validated in order to verify that all detected removable hardware is properly recognized and supported by the IHS. The hardware validation mode may also identify any improvable performance issues based on the installation location of each removable hardware component. In certain embodiments, the booting of the operating system is suspended and the IHS is diverted to the hardware validation mode by a baseboard management controller of the IHS that may be configured to implement all or part of the described hardware validation process.

At step 325, the removable hardware components that are installed in the IHS are identified. As described, various connectors provided by the motherboard of an IHS may be used to couple various types of removable hardware to the IHS. For instance, memory modules may be installed within DIMM slots provided by the motherboard and a wide variety of different types of PCIe devices may be installed within PCIe slots. Various other types of removable hardware components may be similarly connected to the IHS via connectors or other coupling interfaces. As described with regard to the BIOS 117 of FIG. 1, the BIOS and/or a BMC of an IHS may be configured to detect and initialize each of the hardware components installed in IHS, including removable hardware components. For instance, such initialization procedures may utilize the bus protocols supported by the respective slots to interrogate all hardware components that are detected within the slots that support removable hardware components. At step 330, the specific connectors to which each removable hardware component is installed are also determined. The resulting listing of removable hardware components and associated connectors may be generated during initialization of the IHS by the BIOS and/or BMC and may thus available for use during the hardware validation process.

Based on the listing of removable hardware components and the connectors by which each removable hardware component is installed, at step 335, a support level is determined for each of the removable hardware components. In certain embodiments, a support level may be determined by a baseband management controller of the IHS based on a listing of removable hardware that is supported by the particular model and configuration of the IHS. In certain embodiments, the baseband management controller may query a remote resource for such a listing of removable hardware components that are supported by a particular type of IHS. In certain scenarios, such listings may also provide performance characteristics for the individual removable hardware components in the various supported configurations of the IHS. The listing of supported components may also provide performance characteristics for the removable hardware components at each of the supported connectors to which a removable hardware component may be coupled. For example, as described with regard to FIG. 2, one type of PCIe connector available within an IHS may be configured as a 16 lane (x16) link and another type of available PCIe connector may be configured at an eight lane (x8) link. In such a scenario, the listing of supported removable PCIe components may specify performance characteristics for the supported PCIe components when coupled to each type of PCIe connector.

In certain scenarios, the determined support level may only indicate that a removeable hardware component is not functional and thus cannot be supported. For instance, interrogation of a DIMM slot may indicate the presence of a component within the slot, but the component may not be identifiable. Such scenarios may result from improper installation of a removable hardware component. For example, a memory module may be inserted into a DIMM slot, but not fully seated and completely secured within the slot. In such scenarios, the interrogation of the DIMM slot may indicate a component is present, but improper seating of the memory module within the slot may prevent communication with the memory module. In other scenarios, a hardware component may be correctly coupled to a connector, but the hardware component may nonetheless be unidentifiable and thus cannot be initialized or utilized in any form. In such scenarios where a component is detected at a specific connector, but the component cannot be identified, the support level indicates that the component is not functional and cannot be supported.

In other scenarios, a hardware component that is detected within a slot that supports removable hardware components may be identified, but the hardware component may nonetheless be unsupported if the component cannot be identified within the listing of hardware components supported by the IHS. In such scenarios, the support level may indicate that the component has been identified, but is not presently supported by the current configuration of the IHS. The support level for such a component may identify the component, and may also indicate that the component is not supported, and thus is not functional.

In certain other scenarios, a removable hardware component may be successfully detected and determined to be a hardware component that is supported by the IHS. However, the listing of supported hardware components may indicate that the removable hardware components is supported at multiple different connectors supported by the IHS. For instance, in certain scenarios, a removable PCIe device may be coupled to an IHS at multiple different PCIe connectors provided on motherboard of the IHS. As described with regard to FIG. 2, different PCIe connectors provided on a motherboard may support different PCIe bandwidths by allocating different numbers of PCIe lanes to different PCIe connectors. The listing of supported hardware components may provide performance characteristics for a removable PCIe device when coupled each of these connectors of different bandwidths. Based on such a listing, the performance characteristics of the removable PCIe device installed at its connector may be compared to the performance characteristics that may be obtained if the removable PCIe device is instead installed at other supported connectors.

In another example, memory modules may be installed within DIMM slots supported by an IHS. The listing of supported removable hardware components may specify various types of memory modules supported by the DIMM slots and performance characteristics for different configurations of memory modules within the DIMM slots. For instance, in certain scenarios, the listing of supported memory modules may reflect different memory performance characteristics for different balanced and unbalanced configurations of the memory modules within the DIMM slots. Memory performance is typically adversely affected by unbalanced allocation of memory modules within the available DIMM slots when compared to balanced allocations of the memory modules within the DIMM slots. Accordingly, a memory module may be supported by any of the compatible DIMM slots, but may result in sub-optimal performance depending the DIMM slots to which each of the memory modules are coupled.

In certain scenarios, the support level for a removable hardware component may be impacted by firmware that is used by the removable hardware component, or a related component that interfaces with the removable hardware component. In such scenarios, the listing of supported hardware components may specify different performance characteristics for a hardware component based on the firmware being utilized. Such scenarios may arise when firmware upgrades provide upgraded capabilities for a supported hardware component or fixes errors in the operation of the hardware component.

In certain scenarios, such as described with regard to FIG. 2, a removable hardware component may be identified, but may only be partially supported by an IHS. For instance, a PCIe device such as a storage controller may be fully supported by certain components of an IHS, such as the storage drives, but may only be partially supported by other components of IHS, such as a baseboard management controller. The listing of the supported removable components may indicate different performance degradations that may result from utilizing such a partially supported PCIe storage controller.

At step 340, the determined performance characteristics for the removable hardware components are compared to any improved performance characteristics that may be obtained by moving a removable hardware component to a different connector supported by the IHS. If no significant performance improvements or resource savings are available, the installation of removable hardware may thus be validated and reported to the administrator via a displayed message. At this point, the administrator may be provided with the option of resuming booting of the IHS at step 355. If, at step 340, configurations of removeable hardware components with improved performance characteristics are identified, either based on switching a removable component to a different connector, a firmware upgrade, installing an additional component or by correctly installing the removable component, the hardware validation process proceeds to step 345, during which recommendations for improving performance are displayed for the administrator.

In scenarios where a hardware component has been detected within a slot that supports removable hardware components, but the component cannot be identified, the recommendation displayed to the administrator at step 345 may indicate that installation of the unidentified component should be manually verified in order to ensure that the component is correctly installed within the removable hardware slot and the component is the correct component that was intended to be installed. In certain embodiments, the recommendation may identify the connector at which the unidentified component has been detected. In certain embodiments the recommendation may specify whether the identified component has been improperly installed with its slot, or whether the identified component is installed in a slot, but is not supported.

As described above, in certain scenarios, a hardware component may be identified within a slot of an IHS that supports removable hardware components, but the identified hardware component may nonetheless not be a component that is supported by the IHS. In certain embodiments, the recommendation for addressing such unsupported hardware components may direct an administrator to download resources, such as drivers, firmware and/or libraries, needed to provide support for the identified hardware component.

In other scenarios, the recommendation for addressing the unsupported hardware may direct the administrator to install additional hardware components necessary for supporting the hardware. For instance, as described with regard to FIG. 2, components may be installed within slots that are only accessible by one processor. In such scenarios, a removable hardware component may be installed within a slot that is nonfunctional until a second processor is installed in the IHS. The generated recommendation may direct administrator to install an additional processor in the IHS in order to utilize the removable hardware components that have been detected within the nonfunctional slots. The recommendation may also warn the administrator against instead moving the component to a slot supported by the existing processor if such a move would require uninstalling another device that is functional and used by IHS.

As described, a removable hardware component may be supported at different connectors, with potentially varying performance characteristics at different connectors. For instance, different PCIe connectors may provide different levels of bandwidth. In certain scenarios, a listing of supported hardware may indicate that moving a removable PCIe device from a lower-bandwidth PCIe connector to a higher-bandwidth PCIe connector will result in improved performance. In such scenarios, the recommendation may indicate the performance improvement that may be gained by moving the PCIe device to the higher bandwidth PCIe connector. However, as described with regard to FIG. 2, in certain scenarios, a removable PCIe device may not be designed to utilize the higher-bandwidth PCIe connection. Accordingly, if such a low-bandwidth PCIe device is detected as being coupled to a higher-bandwidth connection, the generated recommendation may indicate the PCIe lanes that are being underutilized by the removable PCIe device, and may further indicate that no performance degradation will be realized by moving the PCIe device from the higher bandwidth connection to a lower bandwidth connection.

In certain embodiments, the recommendations provided to the administrator may warn the administrator against moving a removable hardware component to an occupied slot. For instance, in a scenario where a removeable hardware component has been identified, but is not supported in the slot which the component is installed, the provided recommendation may specify the components that are installed in other slots that could support the hardware component. Such a recommendation may also warn the administrator against removing hardware components from these other compatible slots, due to different performance issues that may result.

Upon display of the recommendations to the administrator, the administrator may also be provided with options for powering down the IHS or resume booting of the IHS. If, at step 350, the administrator chooses to power down the IHS, the hardware validation process may be exited and the IHS may be shut down. At this point, the administrator may choose to pursue the provided recommendations, such as by moving a removable hardware component to a different connector or by correctly installing removable hardware components. The administrator may instead forgo any provided recommendations and may choose to put the IHS back to service. At step 350, the administrator may instead choose to resume booting of the IHS, in which case the IHS resumes booting at step 355.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for validating the installation of removeable hardware components installed in an IHS (Information Handling System), the method comprising:
   detecting a hardware validation request during booting of the IHS;
   diverting booting of the IHS to a hardware validation process configured to:
      identify a plurality of connectors of an IHS, wherein the connectors support installation of removeable hardware components to the IHS;
      determine a first removeable hardware component is coupled to a first connector of the plurality of connectors and the first removeable hardware component cannot be identified; and
      display a hardware installation recommendation to check the coupling of the first removeable hardware component coupled to the first connector.

2. The method of claim 1, wherein the hardware validation request is detected by a baseboard management controller of the IHS by detecting a depression of a designated push-button component of the IHS.

3. The method of claim 2, wherein the push-button is located on a chassis of the IHS.

4. The method of claim 1, wherein the booting of the IHS operating system is suspended during the operation of the hardware validation process.

5. The method of claim 1, further comprising:
   determining that the first removeable hardware component coupled to the first connector is not accessible to a first processor of the IHS.

6. The method of claim 5, wherein the hardware installation recommendation further specifies moving the first removeable hardware component to a second connector that is accessible by the first processor.

7. The method of claim 1, wherein the hardware validation process is executed by a baseboard management controller of the IHS while booting of the IHS is suspended.

8. The method of claim 1, wherein the hardware installation recommendation specifies a second removeable hardware component that must be installed in the IHS to utilize the first removeable hardware component while coupled to the first connector.

9. An IHS (Information Handling System) comprising:
   one or more hardware connectors;
   one or more processors;
   a plurality of removeable hardware components, each coupled to one or more of the hardware connectors; and
   a memory device coupled to the one or more processors, the memory device storing computer-readable instructions that, upon execution by the one or more processors, cause the system to:
   detect a hardware validation request during booting of the IHS;
   divert booting of the IHS to a hardware validation process configured to:
      determine a first removeable hardware component coupled to a first connector of the one or more hardware connectors;
      determine the first removeable hardware component coupled to the first connector cannot be identified; and
      display a hardware installation recommendation to check the coupling of the first removeable hardware component coupled to the first connector.

10. The IHS of claim 9, wherein the hardware validation request is detected by a baseboard management controller of the IHS by detecting a depression of a designated push-button component of the IHS.

11. The IHS of claim 10, wherein the push-button is located on a chassis of the IHS.

12. The IHS of claim 9, wherein the booting of the IHS operating system is suspended during the operation of the hardware validation process.

13. The IHS of claim 9, wherein the execution of the computer-readable instructions further causes the system to:
   determine that the first removeable hardware component coupled to the first connector is not accessible to a first processor of the one or more processors of the HIS.

14. The IHS of claim 13, wherein the hardware installation recommendation further specifies moving the first removeable hardware component to a second connector that is accessible by the first processor.

15. The IHS of claim 9, wherein the hardware installation process is executed by a baseboard management controller of the IHS while booting of the IHS is suspended.

16. The IHS of claim 9, wherein the hardware installation recommendation specifies a second removeable hardware component that must be installed in the IHS to utilize the first removeable hardware component while coupled to the first connector.

17. A non-transitory computer-readable storage device having program instructions stored thereon for validating the installation of hardware components installed in an IHS (Information Handling System), upon execution by one or more processors, the program instructions cause the one or more processors to:
   detect a hardware validation request during booting of the IHS;
   divert booting of the IHS to a hardware validation process configured to:
      identify a plurality of connectors of an IHS, wherein the connectors support installation of removeable hardware components to the IHS;
      determine a first removeable hardware component is coupled to a first connector of the plurality of connectors and the first removeable hardware component cannot be identified; and
      display a hardware installation recommendation to check the coupling of the first removeable hardware component coupled to the first connector.

18. The non-transitory computer-readable storage device of claim 17, wherein the hardware validation request is detected by a baseboard management controller of the IHS by detecting a depression of a push-button located on a chassis of the IHS.

19. The non-transitory computer-readable storage device of claim 17, wherein the booting of the IHS operating system is suspended during the operation of the hardware validation process.

20. The non-transitory computer-readable storage device of claim 17, the program instructions further causing the one or more processors to:
 determine that the first removeable hardware component coupled to the first connector is not accessible to a first processor of the one or more processors of the IHS.

* * * * *